Jan. 28, 1936.  J. CREE ET AL  2,029,222
CAMERA ATTACHMENT
Filed Aug. 6, 1934

John Cree
John William Horn
INVENTORS

BY Victor J. Evans & Co.
ATTORNEY

Patented Jan. 28, 1936

2,029,222

UNITED STATES PATENT OFFICE 2,029,222

CAMERA ATTACHMENT

John Cree, Caistor Centre, Ontario, and John William Horn, Hamilton, Ontario, Canada Application August 6, 1934, Serial No. 738,724

1 Claim. (Cl. 88—1.5)

This invention relates to camera attachments and has for the primary object the provision of a device of this character which may be readily positioned over the view finder of a camera when desired for the purpose of providing a shade thereto, to prevent light and shadows from interfering with a person seeing the view, object of the like by the view finder and which may be loosely connected to the camera and equipped with means to be engaged by a person's finger for holding the attachment in position for use and which permits the attachment to be adapted to either view finder of the camera when the latter is equipped with more than one view finder.

With these and other objects in view this invention consists in certain novel features of construction, combination and arrangement of parts to be hereinafter more fully described and claimed.

For a complete understanding of our invention, reference is to be had to the following description and accompanying drawing, in which Figure 1 is a fragmentary front elevation illustrating a camera with an attachment applied thereto and constructed in accordance with our invention.

Figure 1:
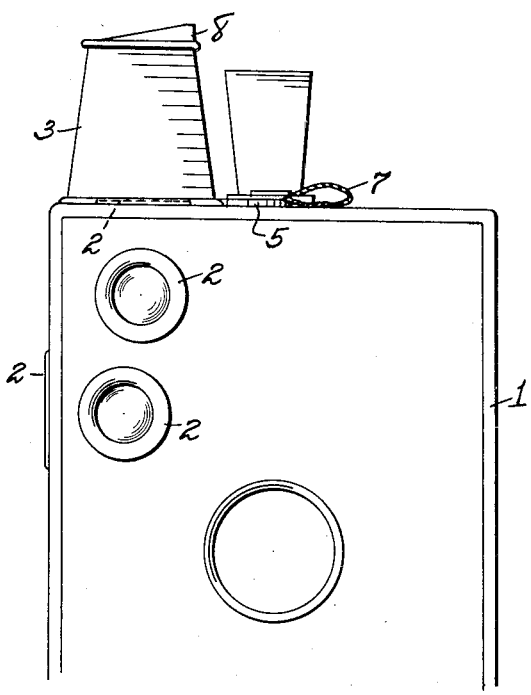
Figure 2:
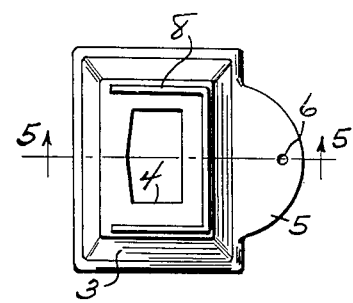
Figure 2 is a top plan view illustrating the attachment.
Figure 3:
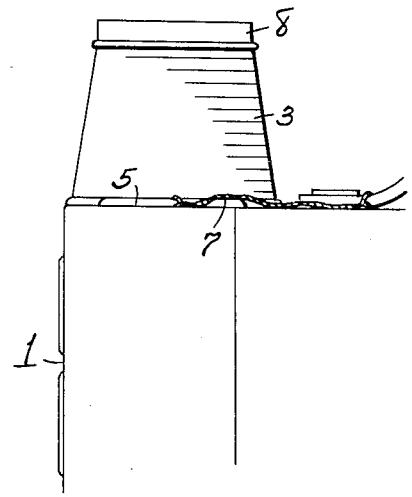
Figure 3 is a fragmentary side elevation illustrating the camera and attachment.
Figure 4:
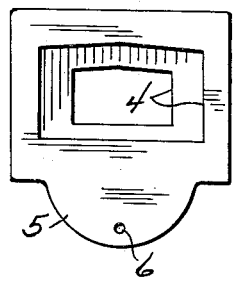
Figure 4 is a bottom plan view illustrating the attachment.

Referring in detail to the drawing, the numeral 1 indicates a conventional type of camera equipped with view finders 2 either of which may have our attachment applied thereto. The attachment consists of a truncated body 3 provided at its top and bottom with aligned openings 4, the opening in the top being smaller than the opening in the bottom. Extending from the body 3 at the lower end thereof is an ear 5 apertured, as shown at 6, to permit one end of a flexible element 7 to be attached thereto. The other end of said element 7 may be secured to the camera 1 on the handle thereof, as shown in Figure 1. The flexible element 7 permits the body to be positioned over either of the view finders and the ear provides a medium on which a person may rest a finger for holding the body in position with respect to the selected view finder.

Figure 5:
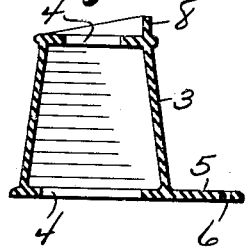
Figure 5 is a sectional view taken on the line 5—5 of Figure 2.

Light deflecting flanges 8 are formed integrally with the upper end of the body and extend on three sides of the upper opening and opposing flanges taper, as shown in Figure 5. The body when applied to a view finder will prevent light and shadows from affecting the view finder and permits a person to readily see or view the object in the view finder. The body and parts integral therewith are constructed of rubber or any other material suitable for the purpose.

While our invention is shown as applicable to one type of camera it is to be understood that the invention is readily adaptable to any type of camera employing a view finder.

Having described the invention, we claim:

In combination with a camera having spaced view finders, a truncated body provided with openings in opposite ends and adapted to be positioned over any one of said finders with the openings in alignment with the finders, integrally connected and angularly related flanges formed on one end of the body and extending about three sides of one of the openings of the body, an ear formed on the body to provide a finger piece, and a flexible element connecting said ear to the camera, and of a length to permit the body being positioned over any one of the view finders.

JOHN CREE.
JOHN WILLIAM HORN.